(12) United States Patent
Chou et al.

(10) Patent No.: US 8,116,175 B2
(45) Date of Patent: *Feb. 14, 2012

(54) HEAT-ASSISTED MAGNETIC RECORDING HEAD INCLUDING PLASMON GENERATOR

(75) Inventors: Tsutomu Chou, Tokyo (JP); Eiji Komura, Tokyo (JP); Koji Shimazawa, Tokyo (JP); Shinji Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 12/719,496

(22) Filed: Mar. 8, 2010

(65) Prior Publication Data
US 2011/0216634 A1    Sep. 8, 2011

(51) Int. Cl.
*G11B 11/00* (2006.01)
(52) U.S. Cl. .................. 369/13.33; 369/112.27
(58) Field of Classification Search ............. 369/13.02, 369/13.03, 13.12, 13.13, 13.24, 13.32, 13.33, 369/112.27; 360/59, 245.3; 385/31, 129
See application file for complete search history.

(56) References Cited

U.S. PATENT DOCUMENTS

| | | | |
|---|---|---|---|
| 7,221,826 B2 | 5/2007 | Hanashima et al. | |
| 7,454,095 B2 | 11/2008 | Baehr-Jones et al. | |
| 7,529,158 B2 | 5/2009 | Matsumoto et al. | |
| 7,821,732 B2 * | 10/2010 | Komura et al. | 360/59 |
| 7,911,882 B2 * | 3/2011 | Shimazawa et al. | 369/13.33 |
| 8,000,178 B2 * | 8/2011 | Shimazawa et al. | 369/13.33 |
| 2007/0139818 A1 | 6/2007 | Shimazawa et al. | |
| 2009/0168220 A1 | 7/2009 | Komura et al. | |
| 2011/0205860 A1 * | 8/2011 | Chou et al. | 369/13.24 |
| 2011/0228419 A1 | 9/2011 | Tanaka et al. | |
| 2011/0228420 A1 | 9/2011 | Hara et al. | |

FOREIGN PATENT DOCUMENTS

JP    A-2004-302241    10/2004

OTHER PUBLICATIONS

U.S. Appl. No. 12/617,853, filed Nov. 13, 2009 under the name Komura et al.
U.S. Appl. No. 12/385,447, filed Apr. 8, 2009 under the name Sasaki et al.
Sep. 15, 2011 Office Action issued in U.S. Appl. No. 12/728,890.
Sep. 21, 2011 Office Action issued in U.S. Appl. No. 12/728,600.
Sep. 21, 2011 Notice of Allowance issued in U.S. Appl. No. 12/710,129.
U.S. Appl. No. 12/557,078, filed Sep. 10, 2009 to Miyauchi et al.
U.S. Appl. No. 12/585,150, filed Sep. 4, 2009 to Sasaki et al.

* cited by examiner

*Primary Examiner* — Ali Neyzari
(74) *Attorney, Agent, or Firm* — Oliff & Berridge, PLC

(57) ABSTRACT

A plasmon generator has a near-field light generating part located in a medium facing surface. The plasmon generator has an outer surface including a plasmon exciting surface and a plasmon propagating surface that face toward opposite directions. The plasmon exciting surface is substantially in contact with an evanescent light generating surface of a waveguide's core. The plasmon propagating surface is in contact with a dielectric layer that has a refractive index lower than that of the core. The plasmon exciting surface includes a first width changing portion. The plasmon propagating surface includes a second width changing portion. Each of the first and second width changing portions has a width that decreases with decreasing distance to the medium facing surface, the width being in a direction parallel to the medium facing surface and the evanescent light generating surface.

12 Claims, 13 Drawing Sheets

Distance from medium facing surface

HEAT-ASSISTED MAGNETIC RECORDING HEAD INCLUDING PLASMON GENERATOR

BACKGROUND OF THE INVENTION

1. Field of the Invention

The present invention relates to a heat-assisted magnetic recording head including a plasmon generator for use in heat-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called heat-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric waveguide are arranged to face each other with a predetermined gap therebetween, and the metal waveguide is coupled with the dielectric waveguide in a surface plasmon mode. It is then conceivable to establish coupling between the light propagated through the waveguide's core and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the core into near-field light with high efficiency. Since the plasmon generator is not directly irradiated with the light propagated through the core, it is also possible to prevent the plasmon generator from excessively increasing in temperature.

In heat-assisted magnetic recording, it is required that intense near-field light be generated from the plasmon generator in order to heat the magnetic recording medium with the near-field light. The above-described technique by itself is not sufficient for that purpose.

For heat-assisted magnetic recording, it is also desired that the position of occurrence of the write magnetic field and the position of occurrence of the near-field light be located as close as possible in the medium facing surface. U.S. Patent Application Publication No. 2007/139818 discloses a magnetic head in which a near-field light generating part that generates near-field light when irradiated with laser light and an end of a main magnetic pole layer are arranged to be laid over each other directly or with a dielectric layer therebetween in the medium facing surface. U.S. Patent Application Publication No. 2009/168220 discloses a magnetic head in which at least a part of a main magnetic pole is interposed between first and second near-field light generating parts each of which generates near-field light when irradiated with laser light.

According to the magnetic heads disclosed in U.S. Patent Application Publication No. 2007/139818 and U.S. Patent Application Publication No. 2009/168220, it is possible that the position of occurrence of the write magnetic field and the position of occurrence of the near-field light are located close to each other. Nevertheless, the direct irradiation of the near-field light generating part with the light precludes efficient transformation of the light into the near-field light.

In the case where a heat-assisted magnetic recording head employs such a configuration that the light propagated through the waveguide's core is coupled with the plasmon generator in a surface plasmon mode through a buffer part, and the position of occurrence of the write magnetic field and the position of occurrence of the near-field light are located close to each other, there arises the following problem. That is, in such a case, both the core and the magnetic pole need to be located near the plasmon generator. It follows that the magnetic pole is located near the core. The magnetic pole is typically made of a magnetic metal material. The presence of such a magnetic pole near the core produces the problem that part of the light propagated through the core can be absorbed by the magnetic pole and the use efficiency of the light propagated through the core thereby decreases.

OBJECT AND SUMMARY OF THE INVENTION

It is an object of the present invention to provide a heat-assisted magnetic recording head that allows efficient use of light propagated through a waveguide's core and allows generation of intense near-field light from a plasmon generator, and to provide a head gimbal assembly and a magnetic recording device that each include such a heat-assisted magnetic recording head.

A heat-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a clad, the core propagating light; a plasmon generator having a near-field light generating part located in the medium facing surface; and a dielectric layer that has a refractive index lower than that of the core.

The core has an evanescent light generating surface that generates evanescent light based on the light propagated through the core. The plasmon generator has an outer surface, the outer surface including a plasmon exciting surface and a plasmon propagating surface that face toward opposite directions. The plasmon exciting surface is substantially in contact with the evanescent light generating surface. The plasmon propagating surface is in contact with the dielectric layer. The plasmon exciting surface includes a first width changing portion. The plasmon propagating surface includes a second width changing portion. Each of the first and second width changing portions has a width that decreases with decreasing distance to the medium facing surface, the width being in a direction parallel to the medium facing surface and the evanescent light generating surface. The second width changing portion has two sides that lie on opposite sides in the direction of the width. Each of the two sides forms an angle in the range of 3 to 50 degrees with respect to a direction perpendicular to the medium facing surface.

In the heat-assisted magnetic recording head of the present invention, a surface plasmon is excited on the plasmon exciting surface through coupling with the evanescent light generated from the evanescent light generating surface. The surface plasmon moves from the plasmon exciting surface to the plasmon propagating surface in the first and second width changing portions, and is further propagated along the plasmon propagating surface to the near-field light generating part. The near-field light generating part generates near-field light based on the surface plasmon.

In the heat-assisted magnetic recording head of the present invention, the distance between the first width changing portion and the second width changing portion may be constant regardless of the distance from the medium facing surface.

In the heat-assisted magnetic recording head of the present invention, the second width changing portion may have a front end part that is formed by the two sides meeting each other. The front end part may be located away from the medium facing surface. In such a case, the plasmon generator may further have a propagation edge that connects the front end part of the second width changing portion to the near-field light generating part.

In the heat-assisted magnetic recording head of the present invention, the plasmon exciting surface may further include a constant width portion. The constant width portion is located farther from the medium facing surface than is the first width changing portion, such that the constant width portion is continuous with the first width changing portion. The constant width portion has a constant width in the direction parallel to the medium facing surface and the evanescent light generating surface regardless of the distance from the medium facing surface.

In the heat-assisted magnetic recording head of the present invention, each of the two sides of the second width changing portion may form an angle in the range of 10 to 25 degrees with respect to the direction perpendicular to the medium facing surface.

In the heat-assisted magnetic recording head of the present invention, the magnetic pole may be located at such a position that the plasmon generator is interposed between the magnetic pole and the core.

In the heat-assisted magnetic recording head of the present invention, the outer surface of the plasmon generator may further include a front end face located in the medium facing surface. The front end face may include a tip that lies at an end farther from the plasmon exciting surface and forms the near-field light generating part. In such a case, the width of the second width changing portion may be smaller than that of the first width changing portion when compared at the same distance from the medium facing surface. The front end face of the outer surface of the plasmon generator may have a triangular shape. The front end face of the outer surface of the plasmon generator may include two portions that decrease in distance from each other with decreasing distance to the tip. In such a case, the plasmon generator may further include a magnetic layer that has an end face interposed between the two portions of the front end face.

A head gimbal assembly of the present invention includes: the heat-assisted magnetic recording head of the present invention; and a suspension that supports the heat-assisted magnetic recording head. A magnetic recording device of the present invention includes: a magnetic recording medium; the heat-assisted magnetic recording head of the present invention; and a positioning device that supports the heat-assisted magnetic recording head and positions the same with respect to the magnetic recording medium.

In the heat-assisted magnetic recording head, the head gimbal assembly, and the magnetic recording device of the present invention, a surface plasmon is excited on the plasmon exciting surface of the plasmon generator through coupling with the evanescent light generated from the evanescent light generating surface of the core of the waveguide. The surface plasmon moves from the plasmon exciting surface to the plasmon propagating surface in the first and second width changing portions, and is further propagated along the plasmon propagating surface to the near-field light generating part. The near-field light generating part generates near-field light based on the surface plasmon. Consequently, the light propagated through the core of the waveguide can be efficiently used to generate near-field light from the plasmon generator.

In the present invention, the width of the second width changing portion of the plasmon propagating surface decreases with decreasing distance to the medium facing surface. According to the present invention, it is thus possible to efficiently enhance the intensity of the near-field light generated from the plasmon generator. Consequently, the present invention allows efficient use of the light propagated through the core of the waveguide and allows generation of intense near-field light from the plasmon generator.

Other and further objects, features and advantages of the present invention will appear more fully from the following description.

DETAILED DESCRIPTION OF THE PREFERRED EMBODIMENTS

First Embodiment

Figure 7:
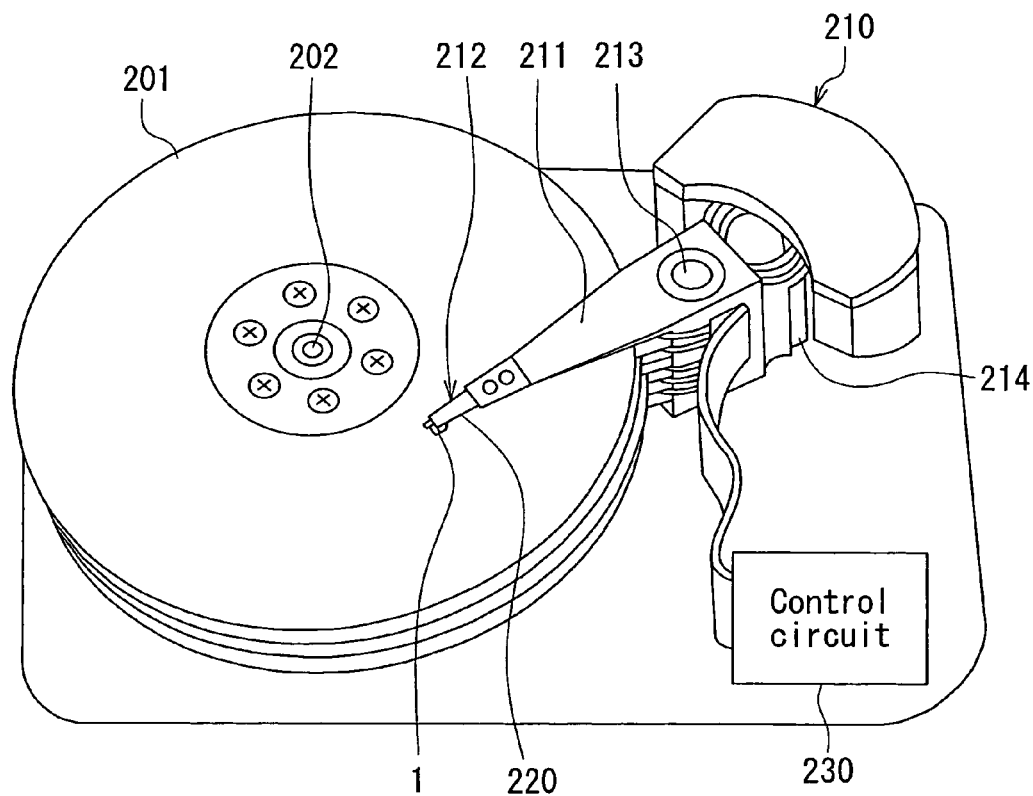
FIG. 7 is a perspective view showing a magnetic recording device according to the first embodiment of the invention.

Preferred embodiments of the present invention will now be described in detail with reference to the drawings. First, reference is made to FIG. 7 to describe a magnetic disk drive as a magnetic recording device according to a first embodiment of the invention. As shown in FIG. 7, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single heat-assisted magnetic recording head 1.

The magnetic disk drive further includes a control circuit 230 that controls the read/write operations of the heat-assisted magnetic recording heads 1 and also controls the light emitting operation of a laser diode serving as a light source for generating laser light for heat-assisted magnetic recording described later.

Figure 8:
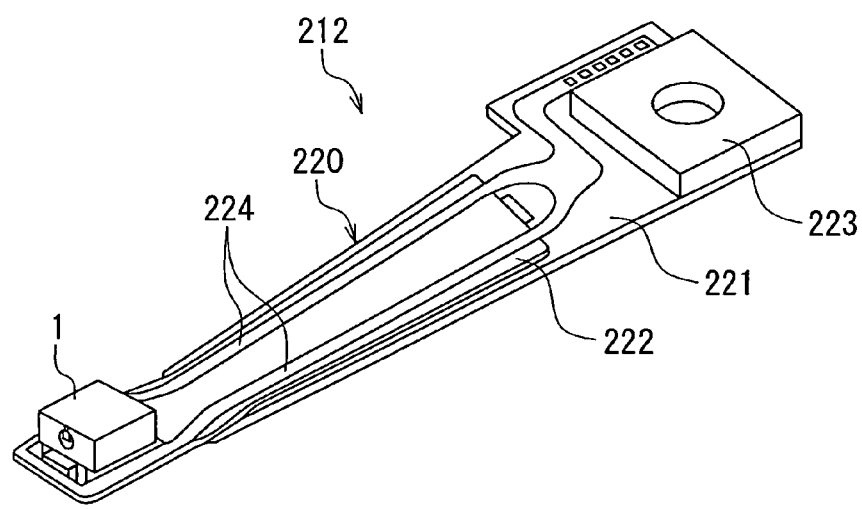
FIG. 8 is a perspective view showing a head gimbal assembly according to the first embodiment of the invention.

FIG. 8 is a perspective view showing the head gimbal assembly 212 of FIG. 7. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 8. For example, the head gimbal assembly of the present invention may have an IC chip for driving the head that is mounted somewhere along the suspension 220.

Figure 9:
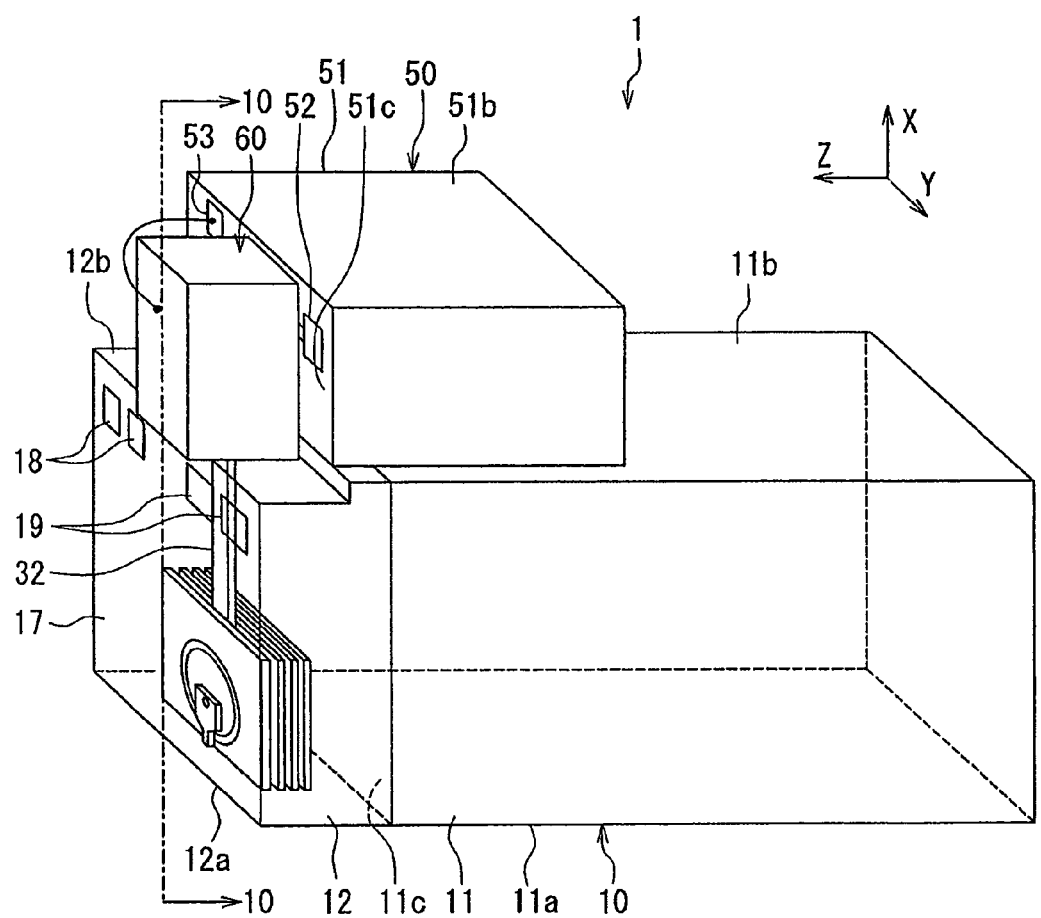
FIG. 9 is a perspective view showing the heat-assisted magnetic recording head according to the first embodiment of the invention.
Figure 10:
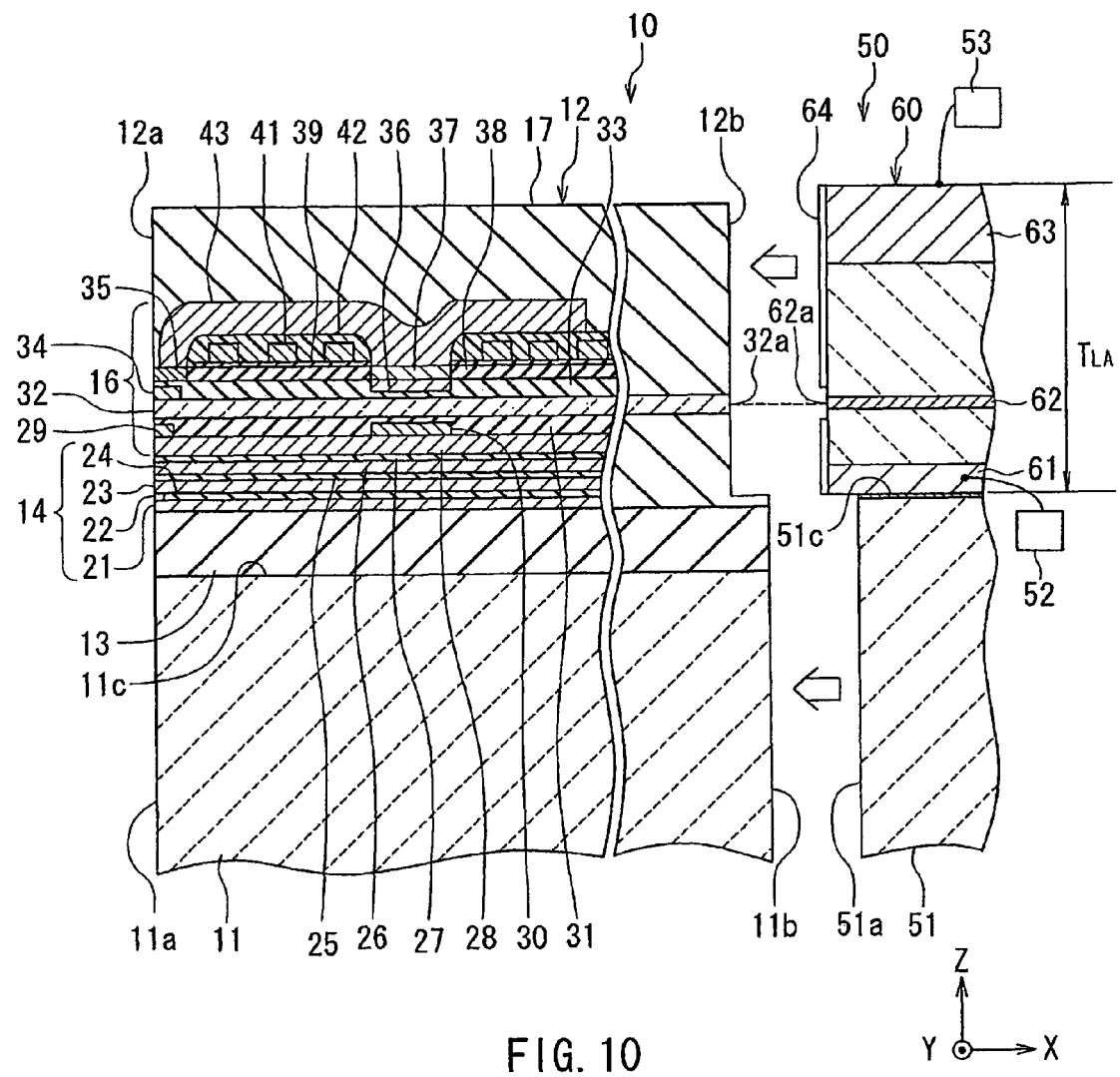
FIG. 10 shows a cross section taken along line 10-10 of FIG. 9.
Figure 11:
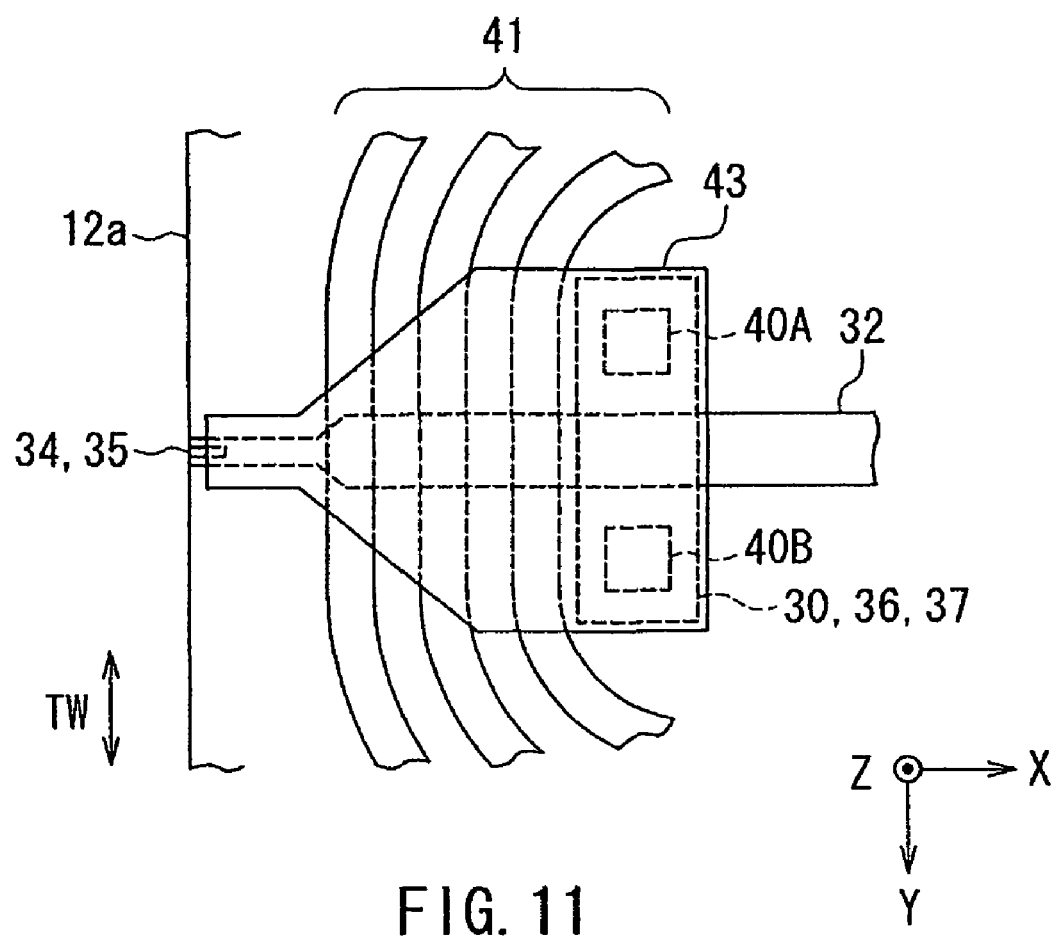
FIG. 11 is a plan view showing a part of the head unit of the heat-assisted magnetic recording head according to the first embodiment of the invention.

The configuration of the heat-assisted magnetic recording head 1 according to the present embodiment will now be described with reference to FIG. 9 to FIG. 11. FIG. 9 is a perspective view of the heat-assisted magnetic recording head 1. FIG. 10 shows a cross section taken along line 10-10 of FIG. 9. FIG. 11 is a plan view showing a part of a head unit of the heat-assisted magnetic recording head. The heat-assisted magnetic recording head 1 includes a slider 10 and a light source unit 50. FIG. 10 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces that connect the medium facing surface 11a to the rear surface 11b. One of the four surfaces that connect the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that is perpendicular to the element-forming surface 11c and gets away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 10. The Z direction is a direction perpendicular to the element-forming surface 11c and getting away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have the function of a heat sink for dissipating heat generated by the laser diode 60, in addition to the function of supporting the laser diode 60.

As shown in FIG. 10, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head 16 further includes a waveguide and a plasmon generator 34. The waveguide includes a core 32 and a clad. The clad includes a clad layer 31 and a clad layer 33. The clad layer 31 covers the bottom yoke layer 28, the bottom shield layer 29, and the coupling layer 30. The core 32 lies on the clad layer 31. The plasmon generator 34 lies on the core 32 in the vicinity of the medium facing surface 12a. The clad layer 33 covers the clad layer 31, the core 32, and the plasmon generator 34. The core 32 extends in the direction perpendicular to the medium facing surface 12a (the X direction). The core 32 has an incident end 32a, an end face closer to the medium facing surface 12a, a top surface, a bottom surface, and two side surfaces. The end face of the core 32 may be located in the medium facing surface 12a or away from the medium facing surface 12a. FIG. 10 shows an example where the end face of the core 32 is located in the medium facing surface 12a. The core 32 propagates laser light that is emitted from the laser diode 60 and incident on the incident end 32a.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63). The clad layer 33 corresponds to the dielectric layer of the present invention.

The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements.

The write head 16 further includes a magnetic pole 35 that is located at such a position that the plasmon generator 34 is interposed between the magnetic pole 35 and the core 32. The magnetic pole 35 is made of a soft magnetic material, or a magnetic metal material in particular. The shapes and layout of the core 32, the plasmon generator 34 and the magnetic pole 35 will be detailed later.

The write head 16 further includes: a coupling layer 36 embedded in the clad layer 33 at a position away from the medium facing surface 12a; and a coupling layer 37 lying on the coupling layer 36. The coupling layers 36 and 37 are located above the coupling layer 30. The coupling layers 36 and 37 are each made of a soft magnetic material.

As shown in FIG. 11, the write head 16 further includes two coupling portions 40A and 40B that are embedded in the clad layers 31 and 33. The coupling portions 40A and 40B are each made of a soft magnetic material. The coupling portions 40A and 40B are located on opposite sides of the core 32 in the track width direction TW, each at a distance from the core 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the magnetic pole 35, the insulating layer 42 and the coupling layer 37. The top yoke layer 43 is in contact with the top surface of the magnetic pole 35 at a position near the medium facing surface 12a, and in contact with the top surface of the coupling layer 37 at a position away from the medium facing surface 12a.

In the write head 16, the bottom shield layer 29, the bottom yoke layer 28, the coupling layer 30, the coupling portions 40A and 40B, the coupling layers 36 and 37, the top yoke layer 43, and the magnetic pole 35 form a magnetic path for passing a magnetic flux corresponding to the magnetic field produced by the coil 41. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 10, the protection layer 17 is disposed to cover the write head 16. As shown in FIG. 9, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 8.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 10, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 8. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 10. The laser diode 60 and the core 32 are positioned so that the laser light emitted from the laser diode 60 will be incident on the incident end 32a of the core 32.

Figure 1:
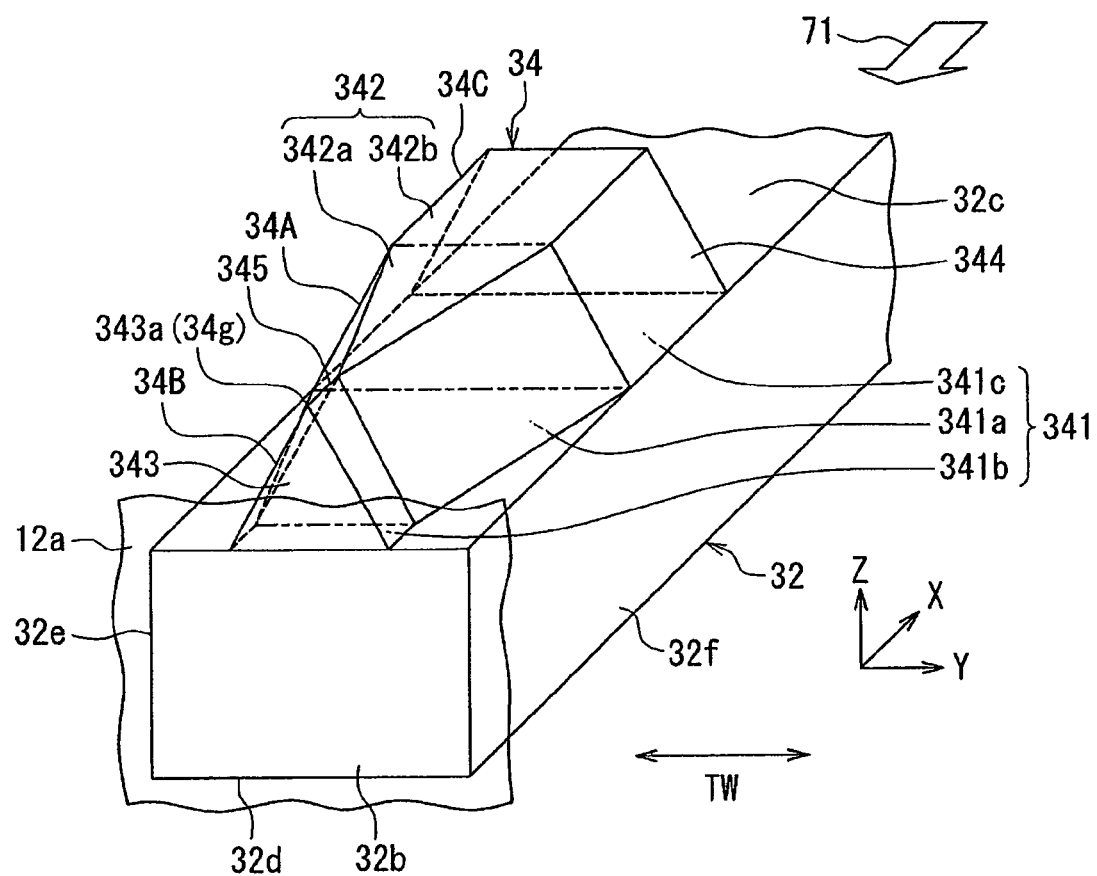
FIG. 1 is a perspective view showing a waveguide's core and a plasmon generator of a heat-assisted magnetic recording head according to a first embodiment of the invention.
Figure 2:
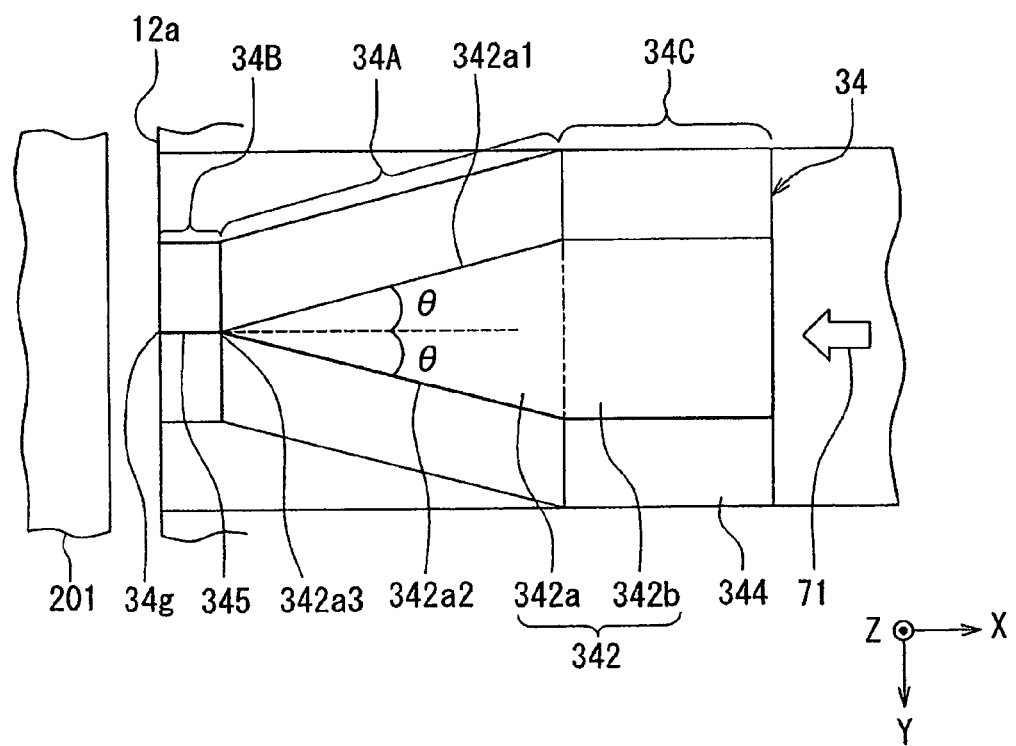
FIG. 2 is a plan view of the core and the plasmon generator shown in FIG. 1.
Figure 3:
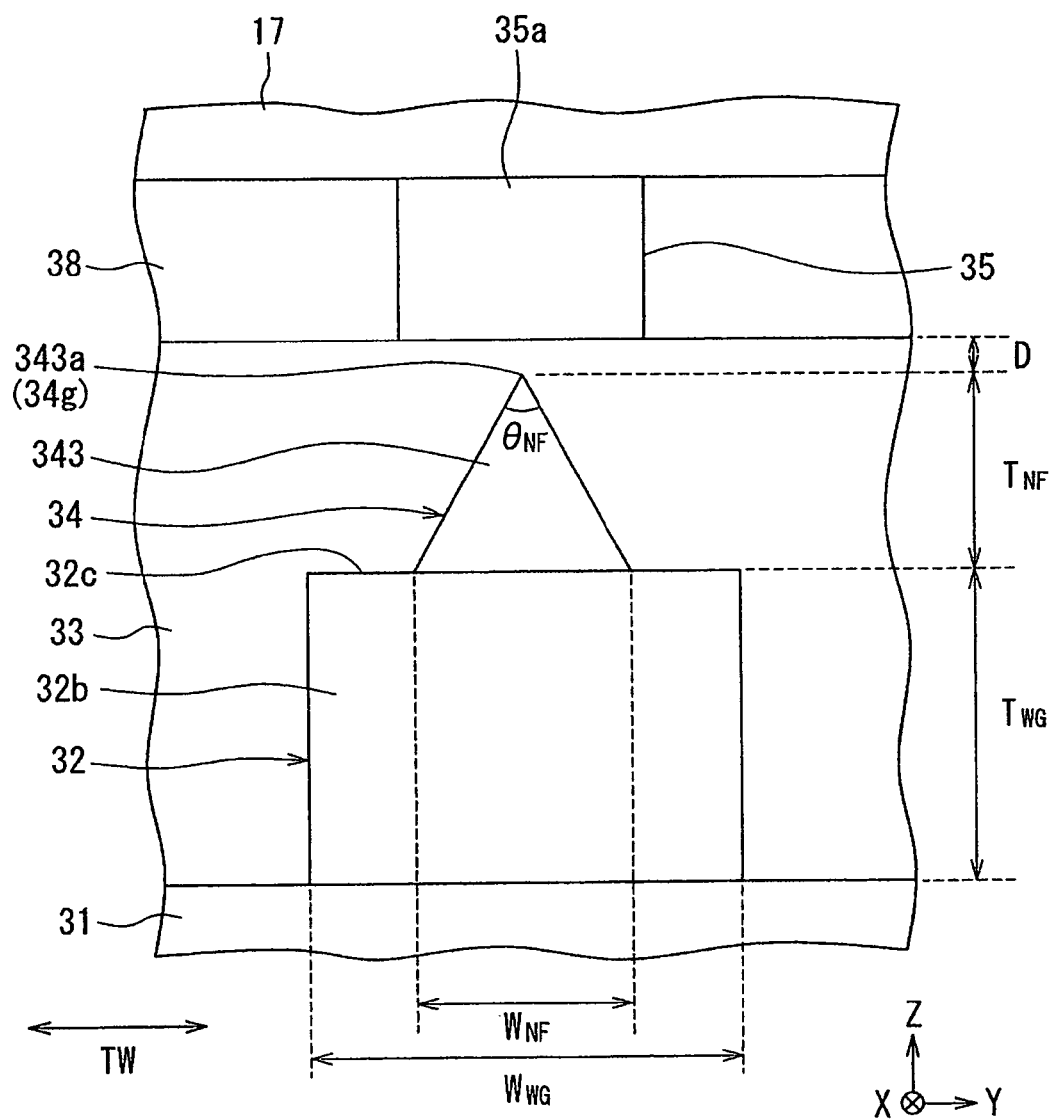
FIG. 3 is a front view showing a part of the medium facing surface of a head unit of the heat-assisted magnetic recording head according to the first embodiment of the invention.
Figure 4:
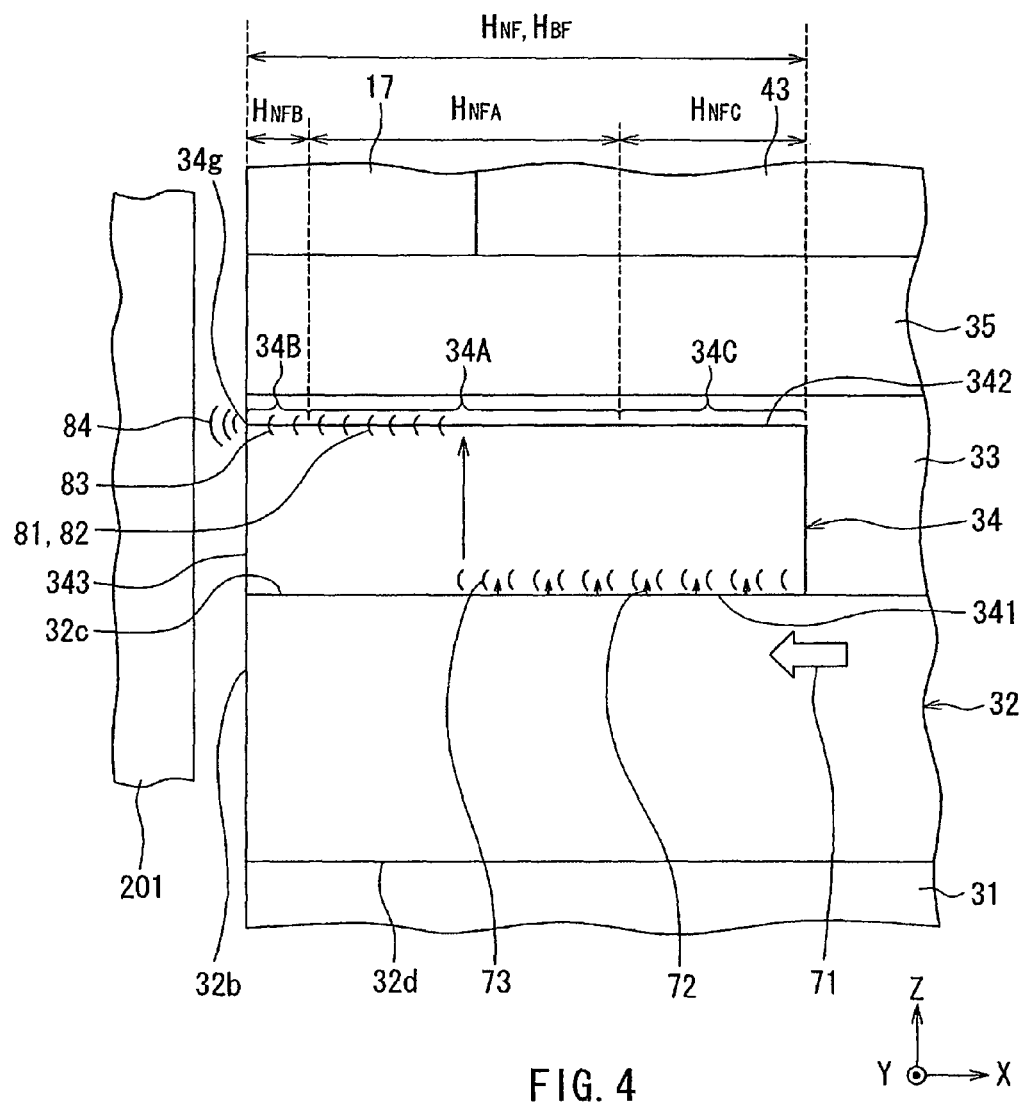
FIG. 4 is a cross-sectional view showing the core, the plasmon generator, and the magnetic pole of the heat-assisted magnetic recording head according to the first embodiment of the invention.

The shapes and layout of the core 32, the plasmon generator 34, and the magnetic pole 35 will now be described in detail with reference to FIG. 1 to FIG. 4. FIG. 1 is a perspective view showing the core 32 and the plasmon generator 34. FIG. 2 is a plan view of the core 32 and the plasmon generator 34 shown in FIG. 1. FIG. 3 is a front view showing a part of the medium facing surface 12a of the head unit 12. FIG. 4 is a cross-sectional view showing the core 32, the plasmon generator 34, and the magnetic pole 35.

Aside from the incident end 32a shown in FIG. 10, the core 32 further has: an end face 32b that is closer to the medium facing surface 12a; an evanescent light generating surface 32c, which is a top surface; a bottom surface 32d; and two side surfaces 32e and 32f, as shown in FIG. 1. The evanescent light generating surface 32c generates evanescent light based on the light propagated through the core 32. FIG. 1 to FIG. 4 show an example where the end face 32b is located in the medium facing surface 12a. The end face 32b may be located away from the medium facing surface 12a, however.

As shown in FIG. 1 to FIG. 3, the plasmon generator 34 includes: a first portion 34A that is located away from the medium facing surface 12a; a second portion 34B that is located between the first portion 34A and the medium facing surface 12a so as to be continuous with the first portion 34A; and a third portion 34C that is located farther from the medium facing surface 12a than is the first portion 34A, such that the third portion 34C is continuous with the first portion 34A.

The second portion 34B has the shape of a triangular prism. The cross section of the second portion 34B parallel to the medium facing surface 12a has the shape of a triangle with the vertex upward.

The end of the first portion 34A in the position of the border with the second portion 34B has the same triangular shape as that of the cross section of the second portion 34B. In positions farther from the medium facing surface 12a than the position of the border with the second portion 34B, the cross section of the first portion 34A parallel to the medium facing surface 12a has the shape of a trapezoid with the upper side shorter than the lower side. Both the upper and lower sides of this cross section of the first portion 34A continuously become greater as the position of the cross section gets farther from the medium facing surface 12a.

The end of the third portion 34C in the position of the border between the first portion 34A and the third portion 34C has the same trapezoidal shape as that of the end of the first portion 34A in the border position. The cross section of the third portion 34C parallel to the medium facing surface 12a has a constant shape regardless of the distance from the medium facing surface 12a, and the shape coincides with that of the end of the third portion 34C in the border position mentioned above.

The plasmon generator 34 has an outer surface including a plurality of portions described below, and has a near-field light generating part 34g located in the medium facing surface 12a. The outer surface of the plasmon generator 34 includes a plasmon exciting surface 341 and a plasmon propagating surface 342 that face toward opposite directions. The plasmon exciting surface 341 and the plasmon propagating surface 342 are parallel to each other. The plasmon exciting surface 341 is substantially in contact with the evanescent light generating surface 32c. What is meant by "substantially in contact" will be described later. The plasmon propagating surface 342 is in contact with the clad layer 33. The outer surface of the plasmon generator 34 further includes a front end face 343 located in the medium facing surface 12a, and a side surface 344 that connects the plasmon exciting surface 341, the plasmon propagating surface 342 and the front end face 343 to each other. The side surface 344 is in contact with the clad layer 33.

The plasmon exciting surface 341 includes a first width changing portion 341a formed by the bottom surface of the first portion 34A, a constant width portion 341b formed by the bottom surface of the second portion 34B, and a constant width portion 341c formed by the bottom surface of the third portion 34C. In FIG. 1, the border between the first width changing portion 341a and the constant width portion 341b and the border between the first width changing portion 341a and the constant width portion 341c are shown by chain double-dashed lines.

The first width changing portion 341a has a width that decreases with decreasing distance to the medium facing surface 12a, the width being in a direction parallel to the medium facing surface 12a and the evanescent light generating surface 32c (the Y direction). Each of the constant width portions 341b and 341c has a constant width in the Y direction regardless of the distance from the medium facing surface 12a. The width of the constant width portion 341c is greater than that of the constant width portion 341b.

The plasmon propagating surface 342 includes a second width changing portion 342a formed by the top surface of the first portion 34A and a constant width portion 342b formed by the top surface of the third portion 34C. In FIG. 1 and FIG. 2, the border between the second width changing portion 342a and the constant width portion 342b is shown by a chain double-dashed line.

As shown in FIG. 2, the second width changing portion 342a has a width that decreases with decreasing distance to the medium facing surface 12a, the width being in the direction parallel to the medium facing surface 12a and the evanescent light generating surface 32c (the Y direction). The second width changing portion 342a has two sides 342a1 and 342a2 that lie on opposite sides in the direction of the width (the Y direction), and a front end part 342a3 that is formed by the two sides 342a1 and 342a2 meeting each other. The front end part 342a3 is located away from the medium facing surface 12a. The angle that the side 342a1 forms with respect to the direction perpendicular to the medium facing surface 12a (the X direction) is equal to the angle that the side 342a2 forms with respect to the direction perpendicular to the medium facing surface 12a (the X direction). This angle will hereinafter be represented by θ. The angle θ falls within the range of 3 to 50 degrees, and preferably within the range of 10 to 25 degrees. The reason for this will be described in detail later.

The constant width portion 342b is located farther from the medium facing surface 12a than is the second width changing portion 342a, such that the constant width portion 342b is continuous with the width changing portion 342a. The constant width portion 342b has a constant width in the direction parallel to the medium facing surface 12a and the evanescent light generating surface 32c (the Y direction) regardless of the distance from the medium facing surface 12a.

When seen from above, the outer edge of the plasmon propagating surface 342 lies inside the outer edge of the plasmon exciting surface 341. When compared at the same distance from the medium facing surface 12a, the width of the second width changing portion 342a is smaller than that of the first width changing portion 341a. The distance between the first width changing portion 341a and the second width changing portion 342a is constant regardless of the distance from the medium facing surface 12a. The first width changing portion 341a has two sides that lie on opposite sides in the direction of the width (the Y direction). Each of the two sides preferably forms an angle in the same range as that of the angle θ with respect to the direction perpendicular to the medium facing surface 12a (the X direction).

As shown in FIG. 1 and FIG. 3, the front end face 343 has the same shape as that of the cross section of the second portion 34B parallel to the medium facing surface 12a, that is, the shape of a triangle with the vertex upward. The front end face 343 includes a tip 343a that lies at an end farther from the plasmon exciting surface 341 and forms the near-field light generating part 34g. Note that the tip 343a may be rounded.

As shown in FIG. 1 to FIG. 3, the plasmon generator 34 further has a propagation edge 345 formed by the top end of the second portion 34B. The propagation edge 345 is parallel to the plasmon exciting surface 341. The propagation edge 345 connects the front end part 342a3 of the second width changing portion 342a to the near-field light generating part 34g (the tip 343a). The propagation edge 345 is in contact with the clad layer 33. As will be described later, the propagation edge 345 propagates plasmons. Note that the propagation edge 345 may be rounded.

As shown in FIG. 3, the magnetic pole 35 has an end face 35a located in the medium facing surface 12a. The end face 35a has a rectangular shape, for example. In the medium facing surface 12a, the end face 35a is located at a predetermined distance from the front end face 343 of the plasmon generator 34.

The plasmon generator 34 need not necessarily have the second portion 34B. When the plasmon generator 34 does not have the second portion 34B, the end of the first portion 34A closer to the medium facing surface 12a is located in the medium facing surface 12a. The plasmon generator 34 need not necessarily have the third portion 34C, either.

As shown in FIG. 3, the width of the core 32 in the track width direction TW (the Y direction) in the vicinity of the plasmon generator 34 will be denoted by the symbol $W_{WG}$. The thickness (dimension in the Z direction) of the core 32 in the vicinity of the plasmon generator 34 will be denoted by the symbol $T_{WG}$. $W_{WG}$ falls within the range of 0.3 to 100 μm, for example. $T_{WG}$ falls within the range of 0.1 to 4 μm, for example. As shown in FIG. 11, the core 32 excluding the part in the vicinity of the plasmon generator 34 may have a width greater than $W_{WG}$.

As shown in FIG. 3, the dimension of the plasmon generator 34 in the track width direction TW (the Y direction) at the medium facing surface 12a will be denoted by the symbol $W_{NF}$. The dimension of the plasmon generator 34 in the Z direction at the medium facing surface 12a will be denoted by the symbol $T_{NF}$. Both $W_{NF}$ and $T_{NF}$ are sufficiently smaller than the wavelength of the laser light that is to be propagated through the core 32. Both $W_{NF}$ and $T_{NF}$ fall within the range of 10 to 100 nm, for example. In the front end face 343 of the plasmon generator 34, the angle formed between the two sides meeting at the tip 343a will be denoted by $\theta_{NF}$. $\theta_{NF}$ falls within the range of 20 to 90 degrees, for example.

As shown in FIG. 4, the length of the plasmon generator 34 in the X direction will be denoted by the symbol $H_{NF}$. $H_{NF}$ falls within the range of 0.6 to 4.0 μm, for example. The lengths of the first portion 34A, the second portion 34B, and the third portion 34C of the plasmon generator 34 in the X direction will be denoted by the symbols $H_{NFA}$, $H_{NFB}$, and $H_{NFC}$, respectively. $H_{NFA}$ falls within the range of 200 to 2000 nm, for example. $H_{NFB}$ falls within the range of 0 to 300 nm, for example. $H_{NFC}$ falls within the range of 0 to 2000 nm, for example.

As shown in FIG. 4, the X-direction length of the area where the plasmon exciting surface 341 of the plasmon generator 34 and the evanescent light generating surface 32c of the core 32 are substantially in contact with each other will be denoted by the symbol $H_{BF}$. $H_{BF}$ preferably falls within the range of 0.6 to 4.0 μm, and is preferably greater than the wavelength of the laser light to be propagated through the core 32. In the example shown in FIG. 4, the end face 32b of the core 32 is located in the medium facing surface 12a, so that $H_{BF}$ is equal to $H_{NF}$.

As shown in FIG. 3, the distance between the tip 343a of the front end face 343 of the plasmon generator 34 and the end face 35a of the magnetic pole 35 will be denoted by the symbol D. D preferably falls within the range of 10 to 100 nm.

Figure 5:
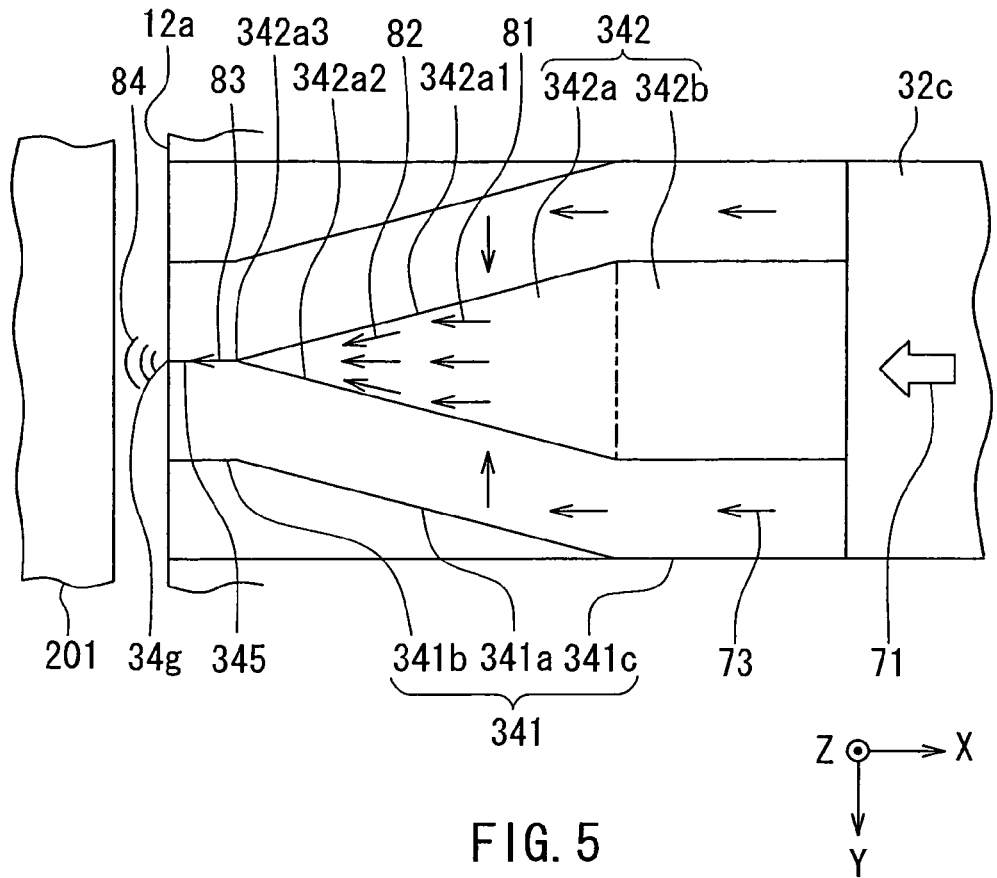
FIG. 5 is an explanatory diagram for explaining the principle of generation of near-field light in the first embodiment of the invention.
Figure 6:
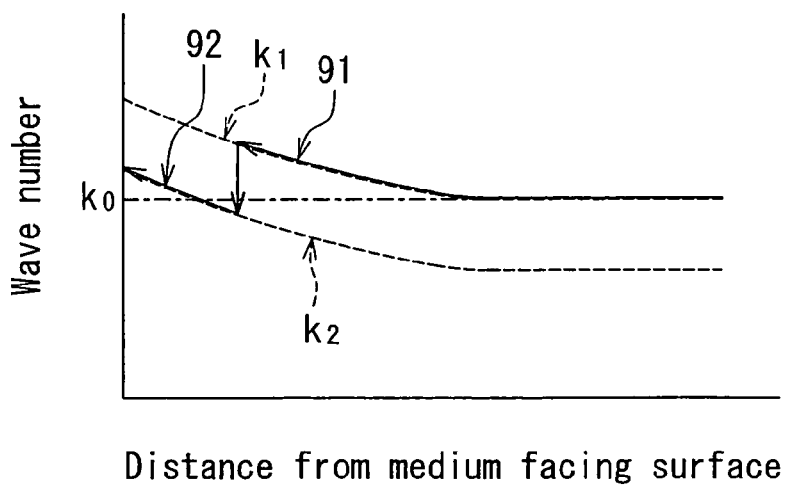
FIG. 6 is a conceptual diagram for explaining the principle of generation of near-field light in the first embodiment of the invention.

Reference is now made to FIG. 4 to FIG. 6 to describe the principle of generation of near-field light in the present embodiment and the principle of heat-assisted magnetic recording using the near-field light. FIG. 5 is an explanatory diagram for explaining the principle of generation of near-field light in the present embodiment, and shows the evanescent light generating surface 32c, the plasmon exciting surface 341, and the plasmon propagating surface 342 as seen from above. FIG. 6 is a conceptual diagram for explaining the principle of generation of near-field light in the present embodiment.

Laser light 71 emitted from the laser diode 60 is propagated through the core 32 to reach the vicinity of the plasmon generator 34. Here, the laser light 71 is totally reflected at the evanescent light generating surface 32c which is the interface between the core 32 and the plasmon generator 34. This generates evanescent light 72 permeating into the plasmon generator 34. Then, the evanescent light 72 and fluctuations of charges on the plasmon exciting surface 341 are coupled with each other to induce a surface plasmon polariton mode. In this way, surface plasmons 73 are excited on the plasmon exciting surface 341 through coupling with the evanescent light 72 generated from the evanescent light generating surface 32c.

Now, the meaning of the plasmon exciting surface 341 being "substantially in contact" with the evanescent light generating surface 32c will be described. That the plasmon exciting surface 341 is "substantially in contact" with the evanescent light generating surface 32c is a requirement in order for the evanescent light occurring from the evanescent light generating surface 32c to penetrate into the plasmon generator 34. Being "substantially in contact" thus covers not only a situation where the plasmon exciting surface 341 is in direct contact with the evanescent light generating surface 32c but also situations where the plasmon exciting surface 341 is put in contact with the evanescent light generating surface 32c through a thin layer that is so thin as to allow the evanescent light occurring from the evanescent light generating surface 32c to penetrate into the plasmon generator 34. For example, the thin layer may be an adhesion film for improving the adhesion of the plasmon generator 34 to the core 32, or may be a film that is unintentionally interposed between the evanescent light generating surface 32c and the plasmon exciting surface 341 in the process of manufacturing the heat-assisted magnetic recording head 1. The thin layer desirably has a thickness of 30 nm or less. Since the interposition of a thin layer between the evanescent light generating surface 32c and the plasmon exciting surface 341 reduces the evanescent light that penetrates into the plasmon generator 34, it is desirable that the plasmon exciting surface 341 be in direct contact with the evanescent light generating surface 32c.

Next, the wave number of surface plasmons that can exist in the interface between a metal and a dielectric will be discussed. Assuming that the metal and the dielectric have permittivities of $\in_1$ and $\in_2$, respectively, the wave number of surface plasmons that can exist in the interface between the metal and the dielectric is in proportion to $\{\in_1 \in_2 /(\in_1 + \in_2)\}^{1/}$ 2. The permittivity is nearly equal to the square of the refractive index. From the foregoing, the higher the refractive index of the dielectric, the higher the wave number of the surface plasmons that can exist in the interface between the metal and the dielectric.

The plasmon propagating surface 342 of the plasmon generator 34 is in contact with the clad layer 33, which is a dielectric layer having a refractive index lower than that of the core 32 with which the plasmon exciting surface 341 is substantially in contact. The wave number of surface plasmons that can exist on the plasmon propagating surface 342 is therefore smaller than that of surface plasmons that can exist on the plasmon exciting surface 341, without regard to the shapes of the plasmon exciting surface 341 and the plasmon propagating surface 342.

In the present embodiment, conditions such as the refractive indexes of the core 32 and the clad layer 33 and the shape of the plasmon generator 34 are selected so that, when compared at the same distance from the medium facing surface 12a, the wave number of the surface plasmons that can exist on the plasmon propagating surface 342 is smaller than that of the surface plasmons that can exist on the plasmon exciting surface 341. In the present embodiment, the foregoing conditions are also selected so that surface plasmons 73 are excited on the constant width portion 341c of the plasmon exciting surface 341 and a part of the first width changing portion 341a continuous with the constant width portion 341c based on the evanescent light 72 occurring from the evanescent light generating surface 32c. In other words, the conditions are selected so that the wave number of surface plasmons that can exist in the portion 341c and the part of the portion 341a coincides or nearly coincides with that of the evanescent light 72.

The surface plasmons 73 excited on the plasmon exciting surface 341 propagate over the plasmon exciting surface 341 toward the front end face 343. The plasmon exciting surface 341 includes the first width changing portion 341a. The first width changing portion 341a decreases in width in the direction parallel to the medium facing surface 12a and the evanescent light generating surface 32c (the Y direction) with decreasing distance to the medium facing surface 12a. In the first width changing portion 341a, the wave number of surface plasmons that can exist therefore increases with decreasing distance from the medium facing surface 12a.

Meanwhile, the plasmon propagating surface 342 includes the second width changing portion 342a. The second width changing portion 342a decreases in width in the direction parallel to the medium facing surface 12a and the evanescent light generating surface 32c (the Y direction) with decreasing distance to the medium facing surface 12a. In the second width changing portion 342a, the wave number of surface plasmons that can exist therefore increases with decreasing distance from the medium facing surface 12a, as with the first width changing portion 341a. It should be noted that when compared at the same distance from the medium facing surface 12a, the wave number of the surface plasmons that can exist in the second width changing portion 342a is smaller than that of the surface plasmons that can exist in the first width changing portion 341a.

FIG. 6 conceptually shows the relationship between the wave number of surface plasmons that can exist on the plasmon exciting surface 341 and that of surface plasmons that can exist on the plasmon propagating surface 342. In FIG. 6, the horizontal axis indicates the distance from the medium facing surface, and the vertical axis indicates the wave number of the surface plasmons. FIG. 6 indicates that the distance from the medium facing surface decreases to the left on the horizontal axis, and the wave number increases upward on the vertical axis. In FIG. 6, $k_0$ indicates the initial wave number of the surface plasmons excited on the plasmon exciting surface 341.

In FIG. 6, the broken line designated by the symbol $k_1$ shows the wave number of the surface plasmons that can exist on the plasmon exciting surface 341. The broken line designated by the symbol $k_2$ shows the wave number of the surface plasmons that can exist on the plasmon propagating surface 342. As described previously, both the wave numbers on the width changing portions 341a and 342a increase with decreasing distance from the medium facing surface 12a. When compared at the same distance from the medium facing surface 12a, $k_2$ is smaller than $k_1$.

In FIG. 6, the solid line designated by the numeral 91 shows the wave number of surface plasmons that propagate over the plasmon exciting surface 341. The solid line designated by the numeral 92 shows the wave number of surface plasmons that propagate over the plasmon propagating surface 342. As shown in FIG. 6, the wave number of the surface plasmons that are excited on the plasmon exciting surface 341 (the reference numeral 91) increases in the process of propagation over the first width changing portion 341a in such a manner as to follow the increase of the wave number $k_1$ of the surface plasmons that can exist on the plasmon exciting surface 341. When $k_1$ deviates greatly from $k_0$, however, it becomes impossible for surface plasmons to exist stably on the plasmon exciting surface 341. Meanwhile, the wave number $k_2$ of the surface plasmons that can exist on the second width changing portion 342a of the plasmon propagating surface 342 increases to approach $k_0$ with decreasing distance from the medium facing surface 12a. When $k_1$ deviates greatly from $k_0$ and $k_2$ approaches $k_0$, it becomes possible for surface plasmons to exist on the plasmon propagating surface 342 more stably than on the plasmon exciting surface 341. Consequently, in the first and second width changing portions 341a and 342a, the surface plasmons propagating over the plasmon exciting surface 341 move from the plasmon exciting surface 341 to the plasmon propagating surface 342 for stable existence. The phenomenon described above was successfully verified by a simulation using a three-dimensional finite-difference time-domain method (FDTD method).

In FIG. 5, the arrows designated by the numeral 81 represent surface plasmons that have moved from the plasmon exciting surface 341 to propagate over the plasmon propagating surface 342. As will be described later, when the surface plasmons 81 propagate over the second width changing portion 342a, the surface plasmons 81 are gradually transformed into edge plasmons 82 which are surface plasmons to propagate along the sides 342a1 and 342a2, and the plasmons including the surface plasmons 81 and the edge plasmons 82 are enhanced in electric field intensity.

The surface plasmons 81 and the edge plasmons 82 reach the propagation edge 345 and are transformed into edge plasmons 83 to propagate through the propagation edge 345. The edge plasmons 83 eventually reach the near-field light generating part 34g. Consequently, the edge plasmons 83 concentrate at the near-field light generating part 34g, and near-field light 84 occurs from the near-field light generating part 34g based on the edge plasmons 83. The near-field light 84 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a write magnetic field produced by the magnetic pole 35 for data writing.

The enhancement of the electric field intensity of the plasmons in the second width changing portion 342a is presumably based on the following first and second principles. Initially, a description will be given of the first principle. In the present embodiment, the surface plasmons 81 propagate over the plasmon propagating surface 342 toward the near-field light generating part 34g. The plasmon propagating surface 342 includes the second width changing portion 342a. The second width changing portion 342a decreases in width with decreasing distance to the medium facing surface 12a. The wave number of the surface plasmons 81 propagating over the second width changing portion 342a increases with a decrease in width of the second width changing portion 342a. As the wave number of the surface plasmons 81 increases, the speed of travel of the surface plasmons 81 decreases. This consequently increases the energy density of the surface plasmons 81 and enhances the electric field intensity of the surface plasmons 81.

Next, a description will be given of the second principle. When the surface plasmons 81 propagate over the plasmon propagating surface 342 toward the near-field light generating part 34g, some of the surface plasmons 81 impinge on the sides 342a1 and 342a2 of the second width changing portion 342a to scatter, thereby generating a plurality of plasmons with different wave numbers. Some of the plurality of plasmons thus generated are transformed into edge plasmons 82 which have a wave number higher than those of the surface plasmons propagating over a flat surface. In this way, the surface plasmons 81 are gradually transformed into the edge plasmons 82 to propagate along the sides 342a1 and 342a2, whereby the edge plasmons 82 gradually increase in electric field intensity. As compared with the surface plasmons propagating over a flat surface, the edge plasmons 82 are higher in wave number and lower in speed of travel. Consequently, the transformation of the surface plasmons 81 into the edge plasmons 82 increases the energy density of the plasmons. In the second width changing portion 342a, the foregoing transformation of the surface plasmons 81 into the edge plasmons 82 is accompanied by the generation of new surface plasmons 81 moving from the plasmon exciting surface 341. The new surface plasmons 81 are also transformed into edge plasmons 82. As a result, the edge plasmons 82 increase in electric field intensity. The edge plasmons 82 are transformed into edge plasmons 83 to propagate through the propagation edge 345. This generates the edge plasmons 83 of enhanced electric field intensity as compared with the surface plasmons 73 originally generated.

In the present embodiment, the surface plasmons 81 propagating over the flat surface and the edge plasmons 82 having a wave number higher than that of the surface plasmons 81 coexist in the second width changing portion 342a. It can be considered that both the surface plasmons 81 and the edge plasmons 82 increase in electric field intensity in the second width changing portion 342a based on the first and second principles described above. According to the present embodiment, it is therefore possible to enhance the electric field intensity of the plasmons as compared with a case where either one of the first principle and the second principle is in operation.

In the present embodiment, the enhancement of the electric field intensity of the plasmons based on the foregoing first and second principles is considered to be taking place also in the first width changing portion 341a of the plasmon exciting surface 341.

Figure 12:
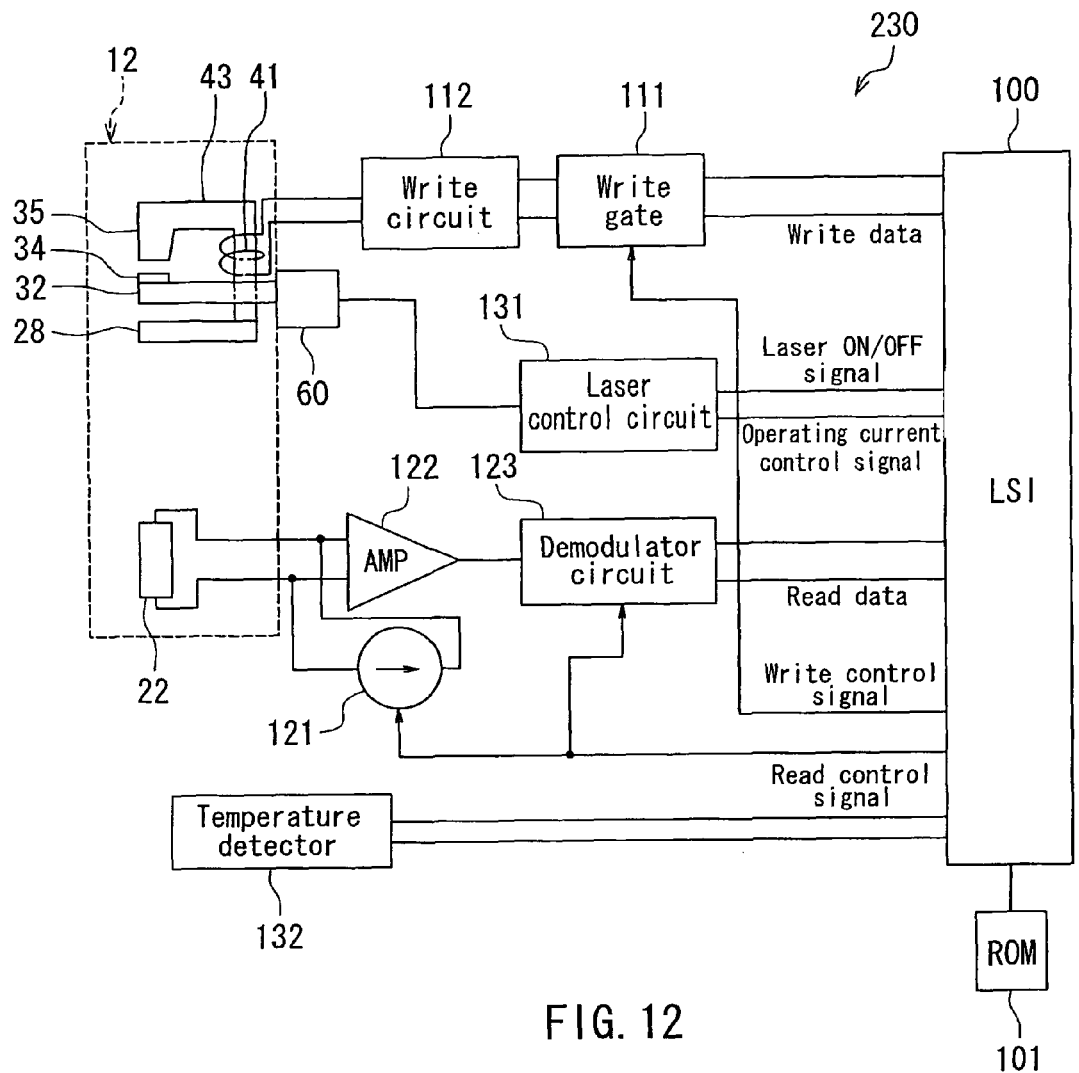
FIG. 12 is a block diagram showing the circuit configuration of the magnetic recording device according to the first embodiment of the invention.

Reference is now made to FIG. 12 to describe the circuit configuration of the control circuit 230 shown in FIG. 7 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the core 32. According to the principle of generation of near-field light described previously, the near-field light 84 occurs from the near-field light generating part 34g of the plasmon generator 34. The near-field light 84 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 84, and data that indicates the temperature dependence of the coercivity of the magnetic recording layer.

As shown in FIG. 12, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 12.

A method of manufacturing the slider 10 of the present embodiment will now be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure that includes pre-slider portions arranged in a plurality of rows, the pre-slider portions being intended to become the sliders 10 later; and forming the plurality of sliders 10 by cutting the substructure to separate the plurality of pre-slider portions from each other. In the step of forming the plurality of sliders 10, the surfaces formed by cutting are polished into the medium facing surfaces 11a and 12a.

The effects of the heat-assisted magnetic recording head 1 according to the present embodiment will now be described. The outer surface of the plasmon generator 34 of the present embodiment includes the plasmon exciting surface 341 and the plasmon propagating surface 342 that face toward opposite directions. The plasmon exciting surface 341 is substantially in contact with the evanescent light generating surface 32c of the core 32. The plasmon propagating surface 342 is in contact with the clad layer 33. The outer surface of the plasmon generator 34 further includes the front end face 343 located in the medium facing surface 12a, and the side surface 344 that connects the plasmon exciting surface 341, the plasmon propagating surface 342 and the front end face 343 to each other. The front end face 343 includes the tip 343a that lies at the end farther from the plasmon exciting surface 341 and forms the near-field light generating part 34g. The plasmon exciting surface 341 includes the first width changing portion 341a. The plasmon propagating surface 342 includes the second width changing portion 342a. In the present embodiment, surface plasmons are excited on the plasmon exciting surface 341 through coupling with the evanescent light that occurs from the evanescent light generating surface 32c. The surface plasmons move from the plasmon exciting surface 341 to the plasmon propagating surface 342 in the first and second width changing portions 341a and 342a, and are further propagated along the plasmon propagating surface 342 to the near-field light generating part 34g. The near-field light generating part 34g generates near-field light based on the surface plasmons.

According to the present embodiment, it is possible to transform the laser light that is propagated through the core 32 into near-field light with higher efficiency, as compared with the conventional technique of irradiating a plasmon antenna directly with laser light to produce near-field light from the plasmon antenna.

In the present embodiment, as previously described, the plasmon propagating surface 342 includes the second width changing portion 342a. The second width changing portion 342a decreases in width in the direction parallel to the medium facing surface 12a and the evanescent light generating surface 32c (the Y direction) with decreasing distance to the medium facing surface 12a. The second width changing portion 342a has the two sides 342a1 and 342a2 lying on opposite sides in the direction of the width (the Y direction). As has been described with reference to FIG. 5, the electric field intensity of the plasmons including the surface plasmons 81 and the edge plasmons 82 is enhanced in the second width changing portion 342a. Consequently, according to the present embodiment, it is possible to efficiently enhance the intensity of the near-field light occurring from the plasmon generator 34.

From the foregoing, according to the present embodiment, it is possible to efficiently use the laser light that is propagated through the core 32, and to generate intense near-field light from the plasmon generator 34. The present embodiment also makes it possible to prevent a part of the medium facing surface 12a from protruding due to transformation of the energy of the laser light into thermal energy in the heat-assisted magnetic recording head.

Now, a description will be given of the result of a simulation showing that the inclusion of the second width changing portion 342a in the plasmon propagating surface 342 can enhance the intensity of the near-field light occurring from the plasmon generator 34. Initially, a plurality of models used in the simulation will be described. The plurality of models used in the simulation include a plurality of models that included the plasmon generator 34 having the second width changing portion 342a, and a model that included a plasmon generator without the second width changing portion 342a (hereinafter, referred to as a model of a comparative example). Note that the plasmon generator 34 having the second width changing portion 342a also had the first width changing portion 341a. The plasmon generator without the second width changing portion 342a was also without the first width changing portion 341a. In every model, the material of the core 32 was tantalum oxide, the material of the plasmon generator 34 was Au, the material of each of the clad layers 31 and 33 was alumina, and the material of the magnetic pole 35 was an FeCo alloy. In every model, the core 32 was 0.4 μm both in width $W_{WG}$ and thickness $T_{WG}$ in the vicinity of the plasmon generator 34.

In the plurality of models that included the plasmon generator 34 having the second width changing portion 342a, the length $H_{NF}$ of the plasmon generator 34 in the X direction was 1.5 μm, and the length $H_{NFB}$ of the second portion 34B of the plasmon generator 34 in the X direction was 100 nm. In the plurality of models that included the plasmon generator 34 having the second width changing portion 342a, the angle θ shown in FIG. 2 was set to respective different values within the range of 3 to 60 degrees. The width of the second width changing portion 342a was increased up to 400 nm with increasing distance from the medium facing surface 12a. The length $H_{NFA}$ of the first portion 34A of the plasmon generator 34 in the X direction therefore varied from one model to another. The length $H_{NFC}$ of the third portion 34C of the plasmon generator 34 in the X direction had a value of $H_{NF}$ minus $H_{NFA}$ and $H_{NFB}$.

The plasmon generator of the model of the comparative example had a cross section in the shape of a triangular prism like the second portion 34B along the entire length in the X direction. The length of this plasmon generator in the X direction was 1.5 µm.

For the simulation, a Gaussian beam with a wavelength of 800 nm was selected as the laser light to be propagated through the core 32. Using a three-dimensional finite-difference time-domain method (FDTD method), the near-field light was measured for the electric field intensity in the vicinity of the surface of the magnetic recording medium 201 that was located 8 nm away from the medium facing surface 12a. The electric field intensity of each model was divided by the electric field intensity of a model of the highest electric field intensity to determine the normalized light intensity by definition.

Figure 13:
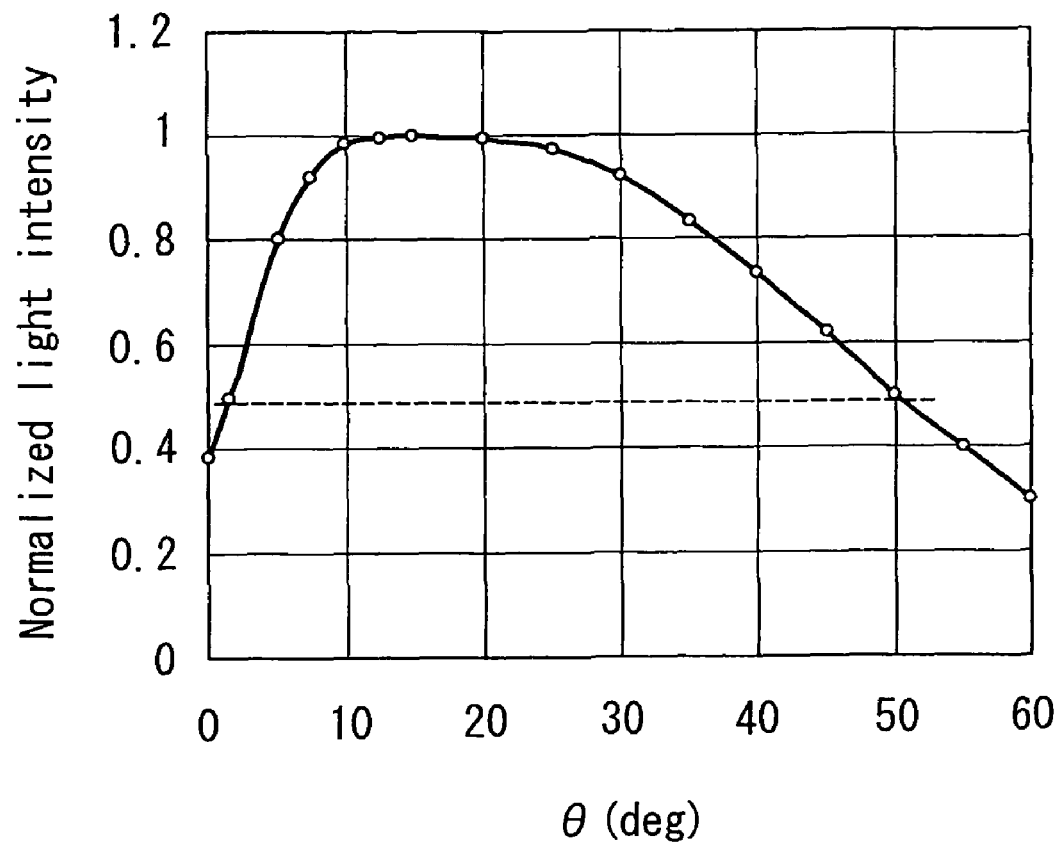
FIG. 13 is a characteristic chart showing the results of a simulation that demonstrate the effects of the heat-assisted magnetic recording head according to the first embodiment of the invention.

FIG. 13 shows the result of the simulation. In FIG. 13, the horizontal axis shows the angle θ and the vertical axis shows the normalized light intensity. In FIG. 13, θ=0 corresponds to the model of the comparative example. The broken line in FIG. 13 indicates the level of a normalized light intensity 20% higher than the normalized light intensity of the model of the comparative example.

As shown in FIG. 13, normalized light intensities significantly higher than that of the model of the comparative example by 20% or more are obtained when θ is within the range of 3 to 50 degrees. In the present embodiment, θ is therefore defined to be in the range of 3 to 50 degrees. Consequently, according to the present embodiment, the intensity of the near-field light occurring from the plasmon generator 34 can be significantly enhanced by 20% or more as compared with the case of using a plasmon generator that does not include the second width changing portion 342a.

As shown in FIG. 13, when θ is within the range of 10 to 25 degrees, the normalized light intensity has a value of 1 or near 1, showing that the near-field light occurring from the plasmon generator 34 is particularly high in intensity. In view of this, it is preferred that θ fall within the range of 10 to 25 degrees.

The other effects of the present embodiment will now be described. In the plasmon generator 34 of the present embodiment, the surface plasmons excited on the plasmon exciting surface 341 move from the plasmon exciting surface 341 to the plasmon propagating surface 342 in the width changing portions 341a and 342a. Consequently, according to the present embodiment, it is possible that the end face 35a of the magnetic pole 35 for generating the write magnetic field and the near-field light generating part 34g of the plasmon generator 34 for generating the near-field light can be put close to each other in the medium facing surface 12a while the plasmon generator 34 is disposed between the magnetic pole 35 and the core 32. This makes it possible to implement an advantageous configuration for heat-assisted magnetic recording. Moreover, according to the present embodiment, the plasmon generator 34 made of a nonmagnetic metal is disposed between the core 32 and the magnetic pole 35. The laser light propagated through the core 32 can thus be prevented from being absorbed by the magnetic pole 35. This can improve the use efficiency of the laser light propagated through the core 32.

Next, a description will be given of the effect resulting from the configuration that the plasmon exciting surface 341 of the plasmon generator 34 includes the constant width portion 341c. Suppose that the plasmon exciting surface 341 does not include the constant width portion 341c, and the width changing portion 341a extends up to the end of the plasmon exciting surface 341 opposite from the medium facing surface 12a. In such a case, the maximum width of the plasmon exciting surface 341 is greater as compared with the case where the plasmon exciting surface 341 includes the constant width portion 341c. Then, the width $W_{WG}$ of the core 32 in the vicinity of the plasmon generator 34 needs to be increased to the maximum width of the plasmon exciting surface 341. Consequently, at least a part of the core 32 in the vicinity of the plasmon generator 34 is likely to enter a multi mode that is capable of propagating a plurality of modes (propagation modes) of light. In this case, the mode that contributes to the excitation of surface plasmons on the plasmon exciting surface 341 weakens to decrease the use efficiency of the light that is propagated through the core 32. In contrast, according to the present embodiment, the plasmon exciting surface 341 includes the constant width portion 341c, and it is therefore possible to make the width $W_{WG}$ of the core 32 in the vicinity of the plasmon generator 34 smaller than that in the case where the plasmon exciting surface 341 does not include the constant width portion 341c. According to the present embodiment, it is therefore possible to bring at least a part of the core 32 in the vicinity of the plasmon generator 34 into a single mode that is capable of propagating only a single mode of light. Consequently, it is possible to improve the use efficiency of the laser light that is propagated through the core 32.

Next, a description will be given of the effect resulting from the configuration that the plasmon generator 34 has the second portion 34B and the propagation edge 345. As described previously, the medium facing surface 12a is formed by polishing a surface that is formed by cutting the substructure. In such a case, the position of the medium facing surface 12a may slightly vary. Suppose that the plasmon generator 34 is designed not to have the second portion 34B or the propagation edge 345 so that the ends of the first portion 34A and the second width changing portion 342a are located in the medium facing surface 12a. If so, variations in the position of the medium facing surface 12a change the shape of the front end face 343 of the plasmon generator 34, or the shape of the tip 343a in particular. As a result, the near-field light occurring from the plasmon generator 34 can vary in characteristic. In contrast, according to the present embodiment, the plasmon generator 34 has the second portion 34B and the propagation edge 345. This makes it possible that, even if the position of the medium facing surface 12a somewhat varies, the front end face 343 of the plasmon generator 34 remains unchanged in shape. According to the present embodiment, it is therefore possible to prevent the characteristics of the near-field light generated by the plasmon generator 34 from being changed due to variations in the position of the medium facing surface 12a.

Second Embodiment

Figure 14:
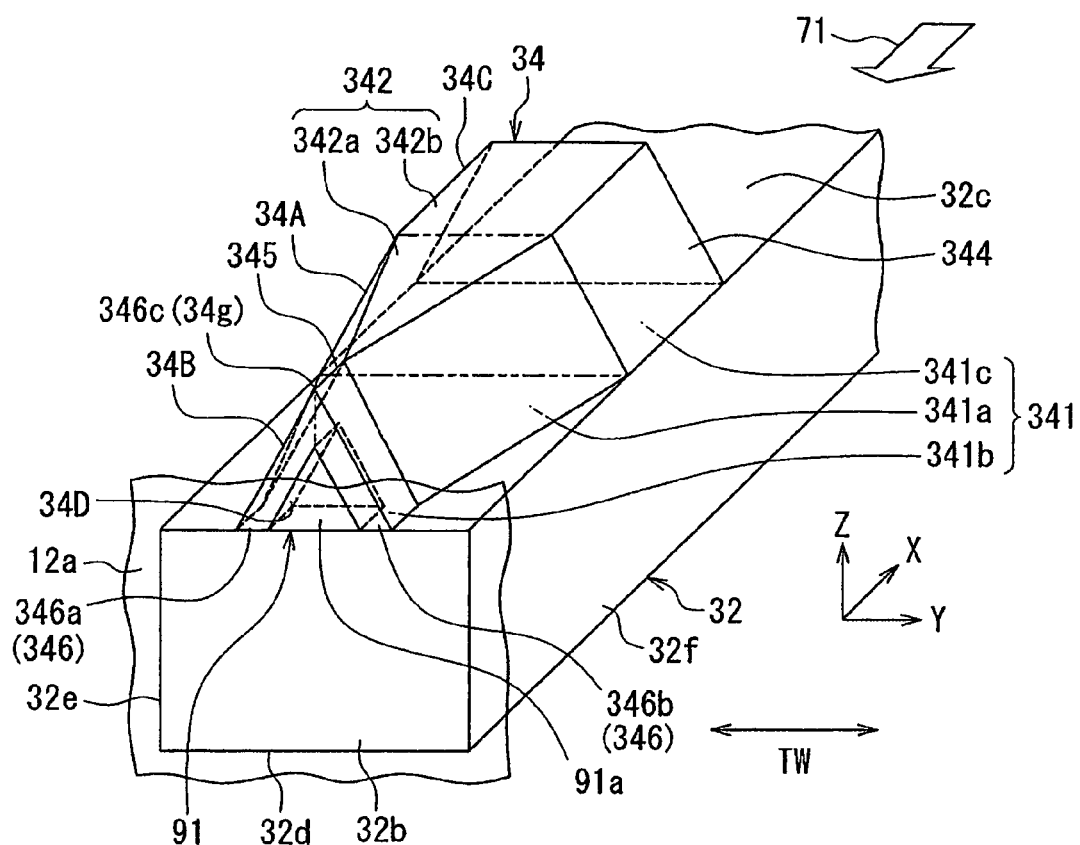
FIG. 14 is a perspective view showing a core, a plasmon generator, and a magnetic layer of a heat-assisted magnetic recording head according to a second embodiment of the invention.
Figure 15:
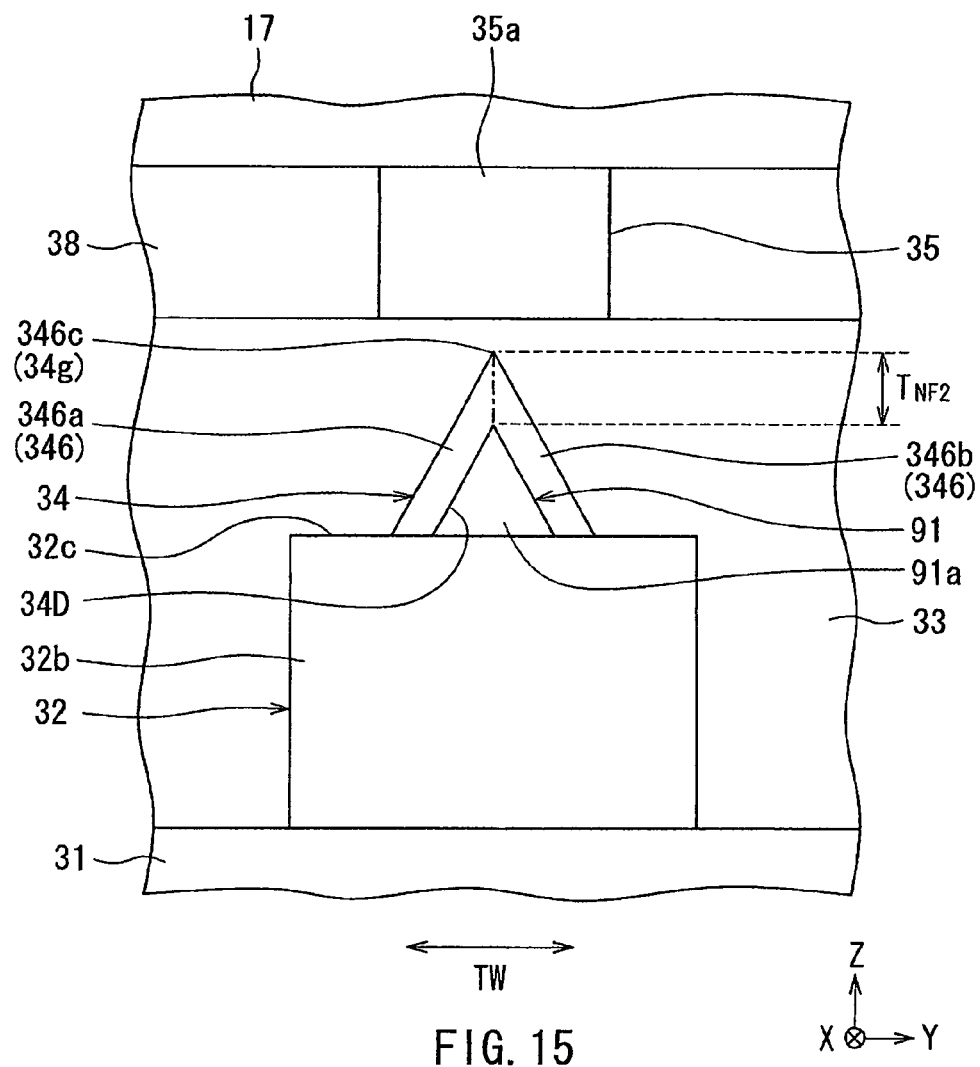
FIG. 15 is a front view showing a part of the medium facing surface of a head unit of the heat-assisted magnetic recording head according to the second embodiment of the invention.

A second embodiment of the present invention will now be described with reference to FIG. 14 and FIG. 15. FIG. 14 is a perspective view showing the core, the plasmon generator, and a magnetic layer of the heat-assisted magnetic recording head according to the present embodiment. FIG. 15 is a front view showing a part of the medium facing surface of the head unit of the heat-assisted magnetic recording head according to the present embodiment.

The heat-assisted magnetic recording head according to the present embodiment includes a magnetic layer 91 surrounded by the core 32 and the plasmon generator 34 in the vicinity of the medium facing surface 12a. The plasmon generator 34 of the present embodiment has a second portion 34B that has a shape different from that in the first embodiment. The second portion 34B of the present embodiment includes two portions that decrease in distance from each other with decreasing distance to the propagation edge 345. The cross section of the second portion 34B parallel to the medium facing surface 12a has an inverted V-shape. The second portion 34B forms an accommodating part 34D for accommodating the magnetic layer 91 between the foregoing two portions and the evanescent light generating surface 32c of the core 32. The magnetic layer 91 has the shape of a triangular prism and is accommodated in the accommodating part 34D. The bottom surface of the magnetic layer 91 is in contact with the evanescent light generating surface 32c of the core 32. The magnetic layer 91 is made of a soft magnetic material such as an FeCo alloy. The magnetic layer 91 may be made of the same material as that of the magnetic pole 35.

The outer surface of the plasmon generator 34 of the present embodiment includes a front end face 346 located in the medium facing surface 12a. The front end face 346 has a shape the same as that of the cross section of the second portion 34B parallel to the medium facing surface 12a. The front end face 346 includes a tip 346c that lies at an end farther from the plasmon exciting surface 341 and forms the near-field light generating part 34g. The front end face 346 further includes two portions 346a and 346b that decrease in distance from each other with decreasing distance to the tip 346c. In FIG. 14 and FIG. 15, the border between the two portions 346a and 346b is shown by alternate long and short dashed lines. The magnetic layer 91 has an end face 91a located in the medium facing surface 12a, the end face 91a being interposed between the two portions 346a and 346b of the front end face 346. As shown in FIG. 15, the distance between the top end of the end face 91a and the tip 346c will be denoted by the symbol $T_{NF2}$. $T_{NF2}$ falls within the range of 25 to 60 nm, for example.

In the present embodiment, as shown in FIG. 15, the end face 35a of the magnetic pole 35 and the end face 91a of the magnetic layer 91 are located in the medium facing surface 12a such that the near-field light generating part 34g is interposed between these end faces. According to the present embodiment, the magnetic layer 91 serves to control the distribution of the write magnetic field produced by the magnetic pole 35.

In the present embodiment, as in the first embodiment, the surface plasmons excited on the plasmon exciting surface 341, which is substantially in contact with the evanescent light generating surface 32c of the core 32, move from the plasmon exciting surface 341 to the plasmon propagating surface 342 in the width changing portions 341a and 342a, and are further propagated to the near-field light generating part 34g via the propagation edge 345. Consequently, even if the magnetic layer 91 is provided to be in contact with the evanescent light generating surface 32c in the vicinity of the medium facing surface 12a, the magnetic layer 91 does not affect the generation of near-field light.

The remainder of configuration, function and effects of the present embodiment are similar to those of the first embodiment.

The present invention is not limited to the foregoing embodiments, and various modifications may be made thereto. For example, possible shapes of the plasmon generator of the present invention are not limited to the shapes described in the foregoing embodiments. The plasmon generator of the present invention need only have at least a portion that constitutes the first and second width changing portions 341a and 342a, i.e., the first portion 34A.

The propagation edge 345 of the plasmon generator 34 may be replaced with a rectangular flat portion that is small in width and is long in the direction perpendicular to the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising:
a medium facing surface that faces a magnetic recording medium;
a magnetic pole that has an end face located in the medium facing surface and produces a write magnetic field for writing data on the magnetic recording medium;
a waveguide including a core and a clad, the core propagating light;
a plasmon generator having a near-field light generating part located in the medium facing surface; and
a dielectric layer that has a refractive index lower than that of the core, wherein:
the core has an evanescent light generating surface that generates evanescent light based on the light propagated through the core;
the plasmon generator has an outer surface;
the outer surface of the plasmon generator includes a plasmon exciting surface and a plasmon propagating surface that face toward opposite directions, the plasmon exciting surface being substantially in contact with the evanescent light generating surface, the plasmon propagating surface being in contact with the dielectric layer;
the plasmon exciting surface includes a first width changing portion;
the plasmon propagating surface includes a second width changing portion;
each of the first and second width changing portions has a width that decreases with decreasing distance to the medium facing surface, the width being in a direction parallel to the medium facing surface and the evanescent light generating surface;
the second width changing portion has two sides that lie on opposite sides in the direction of the width;
each of the two sides forms an angle in the range of 3 to 50 degrees with respect to a direction perpendicular to the medium facing surface;
a surface plasmon is excited on the plasmon exciting surface through coupling with the evanescent light generated from the evanescent light generating surface, the surface plasmon moves from the plasmon exciting surface to the plasmon propagating surface in the first and second width changing portions, and is further propagated along the plasmon propagating surface to the near-field light generating part, and the near-field light generating part generates near-field light based on the surface plasmon.

2. The heat-assisted magnetic recording head according to claim 1, wherein a distance between the first width changing portion and the second width changing portion is constant regardless of the distance from the medium facing surface.

3. The heat-assisted magnetic recording head according to claim 1, wherein:

the second width changing portion has a front end part that is formed by the two sides meeting each other, the front end part being located away from the medium facing surface; and the plasmon generator further has a propagation edge that connects the front end part of the second width changing portion to the near-field light generating part.

4. The heat-assisted magnetic recording head according to claim 1, wherein:

the plasmon exciting surface further includes a constant width portion, the constant width portion being located farther from the medium facing surface than is the first width changing portion, such that the constant width portion is continuous with the first width changing portion; and the constant width portion has a constant width in the direction parallel to the medium facing surface and the evanescent light generating surface regardless of the distance from the medium facing surface.

5. The heat-assisted magnetic recording head according to claim 1, wherein each of the two sides of the second width changing portion forms an angle in the range of 10 to 25 degrees with respect to the direction perpendicular to the medium facing surface.

6. The heat-assisted magnetic recording head according to claim 1, wherein the magnetic pole is located at such a position that the plasmon generator is interposed between the magnetic pole and the core.

7. The heat-assisted magnetic recording head according to claim 1, wherein the outer surface of the plasmon generator further includes a front end face located in the medium facing surface, the front end face including a tip that lies at an end farther from the plasmon exciting surface and forms the near-field light generating part.

8. The heat-assisted magnetic recording head according to claim 7, wherein the width of the second width changing portion is smaller than that of the first width changing portion when compared at the same distance from the medium facing surface.

9. The heat-assisted magnetic recording head according to claim 7, wherein the front end face of the outer surface of the plasmon generator has a triangular shape.

10. The heat-assisted magnetic recording head according to claim 7, wherein:

the front end face of the outer surface of the plasmon generator includes two portions that decrease in distance from each other with decreasing distance to the tip; and the plasmon generator further includes a magnetic layer that has an end face interposed between the two portions of the front end face.

11. A head gimbal assembly comprising: the heat-assisted magnetic recording head according to claim 1; and a suspension that supports the heat-assisted magnetic recording head.

12. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *